Patented Oct. 6, 1925.

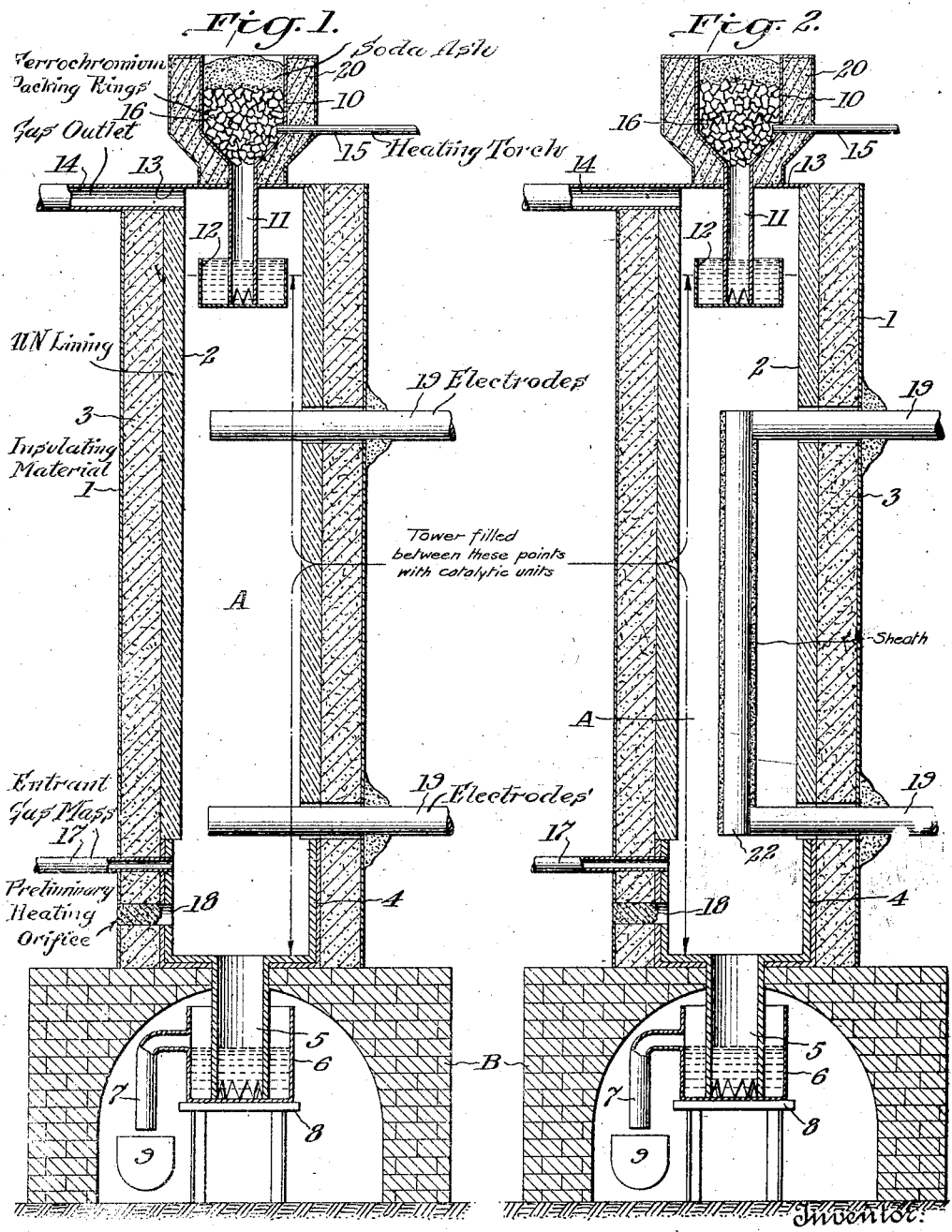

1,556,202

UNITED STATES PATENT OFFICE.

JOHN COLLINS CLANCY, OF NEW YORK, N. Y.

PROCESS OF FIXING NITROGEN.

Application filed July 18, 1922. Serial No. 575,767.

*To all whom it may concern:*

Be it known that I, JOHN C. CLANCY, a citizen of the United States, residing at 416 West 215th Street, in the county of New York and State of New York, have invented certain new and useful Improvements in Processes of Fixing Nitrogen, of which the following is a specification.

This invention relates to the fixation of atmospheric nitrogen in the form of alkali metal cyanids.

Many processes have been suggested for the fixation of nitrogen involving the production of alkali metal cyanids. One of such processes comprises passing briquettes formed of a mixture of the carbonate or hydrate of an alkali metal, carbon, and iron through a highly heated furnace in an atmosphere of nitrogen. Another process heretofore suggested comprises heating certain nitrids such as titanium nitrid and silicon nitrid in admixture with carbon and an alkali metal compound such as sodium carbonate in the presence of nitrogen. In both of these processes it has been recognized that the nitrogen enters into chemical combination more readily at a lower temperature when a metal catalyst is present in the reaction mixture. However, the abovementioned and other similar processes heretofore suggested suffer from the difficulties involved in the recovery of the formed cyanid from the reaction product. It is noted in this connection that aside from the unconverted sodium carbonate, unconsumed carbon and secondary products in the reaction mixture there is also present the metal catalyst which must not only be separated from the cyanid product but also, for economical operation, must be recovered and returned to the process.

An object of my invention is a process for the fixation of nitrogen in the form of cyanid in which some of the objectionable features of prior processes are avoided.

My process broadly comprises reacting upon an alkali-base-supplying material in molten or fluid condition with nitrogen and a carbonaceous gas in the presence of a solid catalyst. The process, more specifically, is characterized by the fact that the molten alkali-base-supplying material and the gas mass, including atmospheric nitrogen and a gaseous carbonaceous compound, are contacted with each other in a reaction zone or chamber in the presence of and in contact with solid masses of a catalytic material which retain their physical form and position and serve not only as the catalyst for the reaction, but also as supporting and distributing packing units for the contacting molten alkali metal compound and the gas mass. The process is further characterized by the fact that the nitrogen fixing reaction is effected in a reaction zone or chamber to which the molten alkali compound is supplied through a trapped inlet and from which the molten reaction product is discharged through a trapped outlet, the gas entering into the reaction and the gaseous reaction products being supplied to and withdrawn from the reaction chamber respectively without interruption of or interference with the continuity and established reacting conditions of the process. Still a further characteristic of the process resides in the use of a furnace heated directly or in part directly by the passage of electrical current through the catalytic material, the latter serving as the conductor and resistor for the current. This feature of heating the furnace by means of electric current passed through the catalytic mass while affording a method of securing the desired high temperature, uniform heating, and accurate temperature control, preferably is combined with a preliminary or supplemental heating of the reagents supplied to the reaction chamber by means of heat derived from the burning of fuel. Further features of the invention will appear hereinafter as the invention is described in detail.

Fused sodium carbonate (soda ash) is fed into a closed furnace shaft through a sealed inlet on to a tower filling of packing units formed of or comprising a high melting point catalytic agent heated by the passage of electric current to a temperature of about 1000° C. or higher. The molten soda ash flows or trickles downwardly through the catalytic packing units countercurrent to the flow of a gas mass comprising about equal parts by volume of atmospheric nitrogen and a gaseous hydrocarbon supplied to the furnace shaft at the lower end. The lower end of the furnace is closed to the atmosphere and is provided with a sealed outlet for the molten reaction product. At the upper end of the furnace shaft is an outlet for waste gases and gaseous reaction products. Molten soda ash and the gas mass comprising nitrogen and a hydrocarbon are continuously supplied to the furnace shaft at the top and bottom respectively and gases and molten reaction products are withdrawn from the furnace shaft at the top and bottom respectively, the temperature of the furnace being maintained and controlled by the passage of electric current through the porous or permeable mass of catalytic packing units.

Sodium carbonate or soda ash is the preferred alkali-base-supplying agent employed in the process principally because it gives satisfactory results and is inexpensive. Instead of sodium carbonate I may employ other alkali metal carbonates such as potassium carbonate, or the alkali metal oxids or hydroxids or bicarbonates and perhaps other alkali metal compounds or mixtures of a plurality of different compounds of one or more alkali metals.

Atmospheric nitrogen is the logical nitrogenous gas for use in the process.

The carbonaceous gas may be either saturated or unsaturated hydrocarbons or mixtures thereof of widely different boiling points. Among the carbonaceous materials which may be used are the hydrocarbons of the paraffin series such as natural gas, methane, gases obtained by the distillation and by cracking petroleum oils, vapors of crude petroleum, kerosene vapors and coke oven gas. The preference with regard to the carbonaceous gas employed will depend upon the cost of the supply of the carbonaceous gas in the particular locality in which the process is carried out. For instance, in the neighborhood of natural gas fields, natural gas may be the least expensive gas, while in another locality an inexpensive supply of coke oven gas might be available, and in an oil field the use of petroleum vapors would be most economical. Producer gas may be employed but its use is not desirable when the process is operated for the purpose of producing cyanid because the cyanid formed in the upper part of the reaction zone is decomposed by the carbon monoxid component of the producer gas in the lower part of the reaction zone and the yield of cyanid in the resulting molten reaction product is low. When it is desired to use producer gas the furnace is operated at a temperature higher than 1000° C., say around 1250° C., whereby the bulk of the cyanid formed is volatilized and passes from the furnace with the gases. The volatilized cyanid may be recovered as such but preferably is converted to ammonia and other nitrogen compounds by treatment of the gases with steam.

On the other hand, if it is desired to produce ammonia the furnace is operated at the high temperature stated for the purpose of volatilizing the cyanids and the use of producer gas then comes into the economical consideration.

With regard to the catalytic material for the process I have discovered that there are a great variety of materials which may be used and there are a number of ways of forming and handling the catalytic material. The catalytic material serves two purposes in the process, first, it promotes the nitrogen fixing reaction and second, it serves as a distributing contact surface for the reacting materials. The catalytic material must therefore be a material which promotes the nitrogen fixing reaction, and it must be capable of withstanding the high temperature and the action of the reacting materials without fusion or disintegration.

In general, I have found that the metal nitrids, carbids, and carbo-nitrids which have the necessary high melting points and which may be formed at relatively low temperatures from the metals or their alloys or their compounds such as, their oxids or natural ores, by the action of a cyanid or other nitrifying agent or by the action of nitrogen and active carbon in the presence of an alkali metal compound are catalytic agents suitable for use in my process.

The catalytic material is employed in the physical form of packing units of either irregular or regular shapes which may be associated as a packing material in either a promiscuous or a symmetrical arrangement.

The packing units may be formed wholly of one catalytic material or a mixture of two or more catalytic materials or they may comprise one or more of the catalytic materials mixed with or bonded by other non-catalytic substances, or the units may be initially formed of material capable of being converted to catalytic material. For instance, the units may be formed or moulded from a single metal in mass or an alloy of two or more metals capable of forming the high melting point carbids, nitrids or carbo-nitrids, or the units may be initially formed of an alloy of a catalyst-forming metal with another non-catalyst-forming metal. Or the units may be initially formed of mixtures of one or more catalyst-forming metals or their alloys in finely divided form bonded with inert materials. The units may also be initially formed of the oxids or other compounds such as the natural ores of one or more of the catalyst-forming metals either alone or associated with a binding agent.

Packing units formed of materials which are not catalysts for the reaction but which are capable of forming the catalytic carbids, nitrids and carbo-nitrids may be charged or packed directly into the nitrogen fixing reactor and there converted to catalytic masses or the catalytic agent may be formed wholly or in part by treatmnt of the units prior to their introduction into the reactor.

Metals which I have found to possess the required characteristics, that is, the capability of forming catalytic nitrids, carbids and carbo-nitrids having the necessary high melting points are chromium, manganese, titanium, tantalum, thorium, niobium, vanadium, zirconium and uranium.

The formation of the catalytic material is illustrated in the following examples.

Tantalum oxid or its natural ore in the form of small lumps is subjected to the action of molten sodium cyanid at high temperature. At about 1000° C. tantalum carbid is formed and at about 1150° C. tantalum nitrid and carbo-nitrid are formed. Or the tantalum oxid or ore in the form of lumps is treated with molten sodium carbonate and a hydrocarbon or active carbon, such as that formed by heating a hydrocarbon to about its cracking temperature, and nitrogen, the carbid being formed at about 1000° C. and the nitrid and carbo-nitrid being formed at about 1150° C. In a similar manner the oxids of thorium, chromium, manganese and titanium may be converted to the carbids, nitrids and carbo-nitrids.

It will be apparent that the formation of the metal carbids, nitrids, and carbo-nitrids by treatment with a molten alkali metal, active carbon and nitrogen as described above may take place either outside of the nitrogen fixing reactor as a preliminary step or in the nitrogen fixing reactor as a part of the nitrogen fixing operation.

A method of forming catalytic packing units is as follows.

The raw material, such as the oxid or natural ore of one or more metals such as those mentioned, is pulverized and mixed with a suitable binder such as starch, glucose or a solution of soda ash. The resulting dough is dried and baked in mass and then broken into pieces of suitable size for packing units or the dough is moulded into the desired form for packing units such as the so-called Raschig rings about two inches in diameter and is then dried and baked. The units so formed are then subjected to treatment with an alkali metal cyanid or with an alkali metal compound and nitrogen and active carbon or a hydrocarbon gas as described above to convert the metal content to the carbids, nitrids and carbo-nitrids or they may be treated with a nitrifying agent such as ammonia.

The treatment with ammonia is illustrated as follows. I grind the natural ore, tantalite, which contains about 70 percent of tantalum oxid and 20 to 25 percent of columbium oxid to about 200 mesh, mix it to a dough with a 20 percent solution of soda ash, mold the dough into rings with thin walls, dry the rings, heat the dried rings in ammonia at a good red heat for about four hours and then at about 1000° C. for four hours more and then cool in an atmosphere of ammonia. The resulting bodies consist principally of tantalum and columbium nitrids and are hard and strong and capable of withstanding the action of the molten alkali metal in the nitrifying operation without fusion or disintegration. In a similar way packing units may be made from the oxids or ores of thorium, manganese, titanium and chromium.

It will be apparent that the catalytic metal carbids, nitrids, and carbo-nitrids formed by the chemical treatment described may thereafter be embodied in the form of packing units by mixing the pulverized material with a binder such as starch, glucose, soda ash, or the like, and moulding the resulting dough and baking it.

When the high melting point metals such as manganese, chromium, titanium, tantalum, thorium or their alloys, such as, ferro-manganese, ferro-chromium, ferro-titanium, ferro-tantalum, nickel-chromium, ferro-uranium, cobalt-chromium and the like metals or alloys are used as packing units in the form of pieces or cast into forms, such as rings, it is preferred to treat the units with sodium cyanid at about 1000° C. to form a catalytic surface on said units before they are employed in the nitrogen-fixing operation.

The carbid of iron is not suitable for use in the process when sodium carbonate is the molten alkali metal compound used because the iron carbid fuses at about 1100° C. and melts down in the furnace stopping the operation of the process. It may be possible to use iron carbid packing units in a process in which an alkali metal compound of lower melting point, such as potassium carbonate or a mixture of sodium and potassium carbonate is used.

I prefer to form the active catalytic compound of the metals, that is, the carbides or nitrids or carbo-nitrids prior to beginning of the nitrogen fixing operation.

I also prefer a mass or column of catalytic packing units comprising a plurality of layers of different catalytic materials.

Many forms of apparatus may be devised for carrying out my process. Two forms of apparatus suitable for carrying out the process are illustrated in the accompanying drawings, in which—

Fig. 1 is a vertical section of my preferred form of apparatus, and

Fig. 2 is a vertical section of a modified form of apparatus.

Referring to Fig. 1, A is the shaft of the furnace which is supported upon a suitable base or foundation B. The shaft A comprises a suitable supporting shell 1 and a lining 2 of refractory brick, preferably aluminum nitrid. The space between the outer shell 1 and the lining 2 is filled with insulating material 3 such as kieselguhr. The top of the shaft is closed by a cover 13 preferably made of ferro-chromium and provided with an integral gas outlet pipe 14. The funnel shaped charging hopper comprises the receptacle 10 containing a filling material 16 such as ferro-chromium packing units and the tube 11 which extends through the cover 13 into the trap pot 12. The receptacle 10 and tube 11 and the trap pot 12 are made of refractory material such as ferro-chromium. The receptacle 10 is provided with an insulating jacket 20 and a torch 15 for heating the contents of the receptacle. The lower end of tube 11 rests upon the bottom of trap pot 12 and is serrated to permit the flow of molten alkali metal compound from the tube into the trap pot. At the lower end of the shaft A the lining 2 is replaced by a ferro-chromium receptacle 4 which communicates with the tube 5, said tube preferably formed of ferro-chromium integral with the receptacle 4. The lower end of tube 5 rests upon the bottom of trap pot 6 and is serrated to permit the flow of molten reaction product from the receptacle 4 through the tube 5 into trap pot 6 and from the trap pot 6 through its overflow pipe 7 into the vessel 9. The trap pot 6, pipe 7, and vessel 9 may be made of ferro-chromium but preferably are made of cast iron. Trap pot 6 is supported upon the table 8. 17 is a gas inlet pipe and 18 is an opening for the insertion of a fuel burner.

The shaft A is provided with electrodes 19, 19 projecting through the wall of the shaft embedded in the catalytic filling material which in its preferred form is constituted as follows. Assuming that the distance from the bottom of the shaft A up to and surrounding the side walls of the trap pot 12 is 10 feet in height, the lower three feet surrounding the lower electrode is filled with ferro-chromium packing units. The next three feet between the electrodes is filled with an equal mixture of units of tantalum nitrid and manganese nitrid. The next one foot surrounding the upper electrode contains ferro-chromium units. The next three feet up to the trap pot 12 is packed with alternate relatively thin layers of manganese carbide and titanium nitrid units with a top layer which firmly embeds the trap pot 12 made up of a mixture of thorium nitrid and thorium carbide packing units. The packing units preferably are in the form of Raschig rings about two inches in diameter.

The electrodes 19, 19 may be formed of carbon, graphite, or the like, but I prefer to use electrodes made of ferro-chromium.

The apparatus illustrated in Fig. 2 is similar to that illustrated in Fig. 1 excepting that a resistor 22 made of carbon which may, if desired, be sheathed, extends through the catalytic mass between the electrodes. In this form of apparatus heat is generated in the reaction zone by electricity passed through the resistor 22.

In place of the two types of electrically heated furnaces illustrated, it is obvious that an induction furnace in which the catalytic mass is the secondary may be used.

It is to be understood that the invention is not limited to the use of the specific apparatus described excepting as is required by the claims.

The process may be carried out in the following manner. The mass of catalytic packing within the furnace shaft A is heated to red heat by means of an oil or gas burner inserted in the opening 18. Electric current is then turned on and the burner removed from the opening 18 which is plugged with zirconium clay. The catalytic packing is then heated up to from 1000° C. to 1200° C. and a mixture of about equal parts by volume of nitrogen and hydrocarbon gas is flowed into the shaft through the pipe 17. Soda ash is charged into the receptacle 10, the packing material 16 having been brought to a temperature of about 900° C. by means of the burner 15. The soda ash melts and flows down through the pipe 11 into the trap pot 12 and over the edge thereof onto the catalytic packing, over which it flows in thin films and drips from unit to unit in intimate contact with the up flowing gas mass. The gases leaving the furnace through the pipe 14 are treated in suitable apparatus which is not shown, either for the recovery of the cyanid fume or with steam for the production of ammonia. The molten cyanid product collects in the receptacle 4 and flows through the tube 5 and through the trap pot 6 and overflow pipe 7 into the vessel 9. Under proper regulation and conditions which are readily controlled the process operates continuously with a good yield of product. The points to be observed for successful operation are more or less obvious in view of the foregoing description. It is noted however, that care must be taken to avoid stoppage of the furnace. Any tendency in this direction will be indicated by an increase in the back pressure of the gas supplied to the furnace through the pipe 17. The temperature within the furnace is readily controlled by varying the amount of electric current supplied. The proper proportions of gas and soda ash supplied are readily determined by observation of the reaction products, that is, the molten cyanid product and the gas issuing through the pipe 14.

The use of ordinary fuel for melting the soda ash to a temperature of 900° C. or higher, very substantially reduces the amount of electrical energy required in the process and consequently reduces the cost of operation while at the same time permitting the thorough and uniform and readily controlled heating of the catalytic filling to a suitably high temperature by means of electrical energy.

The use of high melting point catalyst for the reaction as the supporting and distributing packing for securing intimate contact of the catalytic agent and the reacting materials and also as the electrical resistor for the heating of the reaction mixture is a very important and advantageous feature of the process.

It will be apparent that many processes and many different forms of apparatus may be devised which will fulfill the conditions required in the process.

I claim:

1. In a continuous process of fixing nitrogen the step comprising, subjecting a flowing body of molten oxygen compound the base of which is an alkali metal, to a gas current comprising a carbonaceous gas and nitrogen at a reacting temperature below 1200° C. and above 800° C. in the presence of a high melting point nitrogen containing body which is a solid at said temperatures and capable of reacting with alkali and carbonaceous gas to form cyanid and capable of reacting with nitrogen contained in the reactants to constantly maintain itself as a nitrogen containing body.

2. In a continuous process of fixing nitrogen the step comprising, subjecting a flowing body of molten alkali metal compound to the action of a gas current comprising a carbonaceous gas and nitrogen in a reaction zone wherein the reactants are made to contact with packing units composed of high melting point nitrogen containing bodies capable of both splitting off and combining with nitrogen at reacting temperature during the operation of the process, supplying molten alkali metal compound to said zone through a liquid sealed inlet, and withdrawing the molten reaction product from said zone through a liquid sealed outlet while maintaining said nitrogen containing packing units in said zone.

3. The step in a continuous process of fixing nitrogen as defined in claim 1, in which the alkali metal compound is permitted to flow over the surfaces of a solid nitrogen-containing catalyst.

4. The step in a continuous process of fixing nitrogen as defined in claim 1, in which the alkali metal compound is permitted to flow over the surfaces of a solid metal nitrid containing catalyst.

5. The step in a continuous process of fixing nitrogen as defined in claim 1, in which the alkali metal compound is permitted to flow over the surfaces of a solid catalyst comprising combined tantalum and nitrogen.

6. The step in a continuous process of fixing nitrogen as defined in claim 1 in which the alkali metal compound is permitted to flow over the surfaces of a body of catalytic packing units comprising independent units containing different catalytic metal compounds.

7. The step in a continuous process of fixing nitrogen as defined in claim 1 in which the alkali metal compound is permitted to flow through a body of solid packing units comprising a plurality of layers of units formed of different catalytic materials.

8. In a process of fixing nitrogen the step comprising contacting flowing molten alkali metal compound with nitrogen and hydrocarbon at reacting temperature in contact with stationary catalytic masses shaped to act as supporting and distributing packing units.

9. The step in the process of fixing nitrogen as defined in claim 8 in which said catalytic masses are heated by the passage of electrical current.

10. In a process of fixing nitrogen the step comprising, subjecting high melting point carbo-nitrogenous bodies to the action of a gas comprising nitrogen, hydrogen and carbon, and an alkali metal compound at a temperature sufficient to cause the chemical combination of said alkali metal with carbon and nitrogen but insufficient to melt said carbo-nitrogenous bodies.

11. On a process of fixing nitrogen the step comprising, contacting molten alkali metal compound with nitrogen and a carbonaceous gas in presence of solid catalyst comprising tantalum nitrid at reacting temperature.

12. The step in the process of fixing nitrogen as defined in claim 11 in which said solid catalyst comprises tantalum carbonitrid.

13. In a process of fixing nitrogen the step comprising establishing and maintaining a counter current flow of molten alkali metal compound and gas comprising nitrogen and a hydrocarbon through a fixed porous catalytic body comprising separate zones containing tantalum nitrid, chromium nitrid, thorium nitrid, titanium nitrid and manganese nitrid, at reacting temperature.

In testimony whereof I affix my signature.

JOHN COLLINS CLANCY.